United States Patent
Hutchins

[11] Patent Number: 5,913,685
[45] Date of Patent: Jun. 22, 1999

[54] CPR COMPUTER AIDING

[76] Inventor: Donald C. Hutchins, 60 Brookdale Dr., Springfield, Mass. 01104

[21] Appl. No.: 08/667,946

[22] Filed: Jun. 24, 1996

[51] Int. Cl.[6] .................................................. G09B 23/28
[52] U.S. Cl. ........................................................ 434/265
[58] Field of Search .................................. 434/262, 265, 434/307 R, 308, 323

[56] References Cited

U.S. PATENT DOCUMENTS

| | | | |
|---|---|---|---|
| Re. 34,800 | 11/1994 | Hutchins | 128/898 |
| 1,918,041 | 7/1933 | Knapke . | |
| 3,520,071 | 7/1970 | Abrahamson et al. | 35/17 |
| 3,552,036 | 1/1971 | Mahler | 35/17 |
| 3,736,363 | 5/1973 | Baessler et al. | 35/17 |
| 4,000,565 | 1/1977 | Overby et al. | 35/35 A |
| 4,016,540 | 4/1977 | Hyatt | 340/172.5 |
| 4,020,468 | 4/1977 | Silver et al. | 340/172.5 |
| 4,023,276 | 5/1977 | Furukawa et al. | 33/1 C |
| 4,052,798 | 10/1977 | Tomita et al. | 35/9 A |
| 4,060,915 | 12/1977 | Conway | 35/9 A |
| 4,094,079 | 6/1978 | Dorsett | 35/8 A |
| 4,095,590 | 6/1978 | Harrigan | 128/24 R |
| 4,101,883 | 7/1978 | Hempenius et al. | 340/365 R |
| 4,110,918 | 9/1978 | James et al. | 35/22 R |
| 4,193,064 | 3/1980 | Snyder | 340/309.4 |
| 4,290,114 | 9/1981 | Sinay | 364/900 |
| 4,302,193 | 11/1981 | Haynes | 434/178 |
| 4,307,728 | 12/1981 | Walton | 128/687 |
| 4,331,426 | 5/1982 | Sweeney | 434/265 |
| 4,360,345 | 11/1982 | Hon | 434/262 |
| 4,370,983 | 2/1983 | Lichtenstein | 128/630 |
| 4,420,813 | 12/1983 | Inoue et al. | 364/513 |

(List continued on next page.)

FOREIGN PATENT DOCUMENTS

| | | |
|---|---|---|
| 0 186 713 | 7/1986 | European Pat. Off. . |
| 3638-192 | 5/1988 | Germany . |
| 57-8418 | 1/1982 | Japan . |
| 501-409 | 4/1976 | U.S.S.R. . |
| WO 91/15007 | 10/1991 | WIPO . |
| WO 91/15267 | 10/1991 | WIPO . |

OTHER PUBLICATIONS

"ADA Directions" newsletter, vol. II, Issue 2 & 3, Summer & Fall 1995.

*Primary Examiner*—Robert A. Hafer
*Assistant Examiner*—John Edmund Rovnak
*Attorney, Agent, or Firm*—Fish & Richardson P.C.

[57] ABSTRACT

A cardiopulmonary resuscitation (CPR) aiding computer system provides guidance to rescue personnel trained in CPR for resuscitating a victim under an emergency condition. The system includes an input for entering information signals representative at least of characteristics of the victim relevant to proper performance of CPR techniques, a processing unit responsive to the information signals and for providing output signals representative of proper steps to be taken in resuscitating the victim, and an output, including a display, responsive to the output signals and for providing guidance signals, which include visible signals, such as animated images, on the display, of the proper steps to be taken by the rescue personnel in resuscitating the victim. In one embodiment, the output includes an audio system for producing audible guidance in response to the output signals, wherein the speech guidance is synchronized with the visible guidance. The system can be configured as a personal computer, or as a network of terminals and computers.

43 Claims, 13 Drawing Sheets

Microfiche Appendix Included
(1 Microfiche, 36 Pages)

U.S. PATENT DOCUMENTS

| | | | |
|---|---|---|---|
| 4,457,312 | 7/1984 | Ornato et al. | 128/711 |
| 4,472,146 | 9/1984 | Weissbrod | 434/365 |
| 4,489,387 | 12/1984 | Lamb et al. | 364/514 |
| 4,510,942 | 4/1985 | Miyamae et al. | 128/680 |
| 4,531,310 | 7/1985 | Acson et al. | 40/1.5 |
| 4,583,524 | 4/1986 | Hutchins | 128/1 R |
| 4,588,383 | 5/1986 | Parker et al. | 434/265 |
| 4,797,104 | 1/1989 | Laerdal et al. | 434/263 |
| 4,863,385 | 9/1989 | Pierce | 434/263 |
| 5,088,037 | 2/1992 | Battaglia | 364/413.01 |
| 5,223,828 | 6/1993 | McKiel, Jr. | 340/825.19 |
| 5,239,988 | 8/1993 | Swanson et al. | 128/28 |
| 5,305,374 | 4/1994 | Snyder | 379/88.06 |
| 5,345,705 | 9/1994 | Lawrence | 40/616 |
| 5,365,686 | 11/1994 | Scott | 40/455 |
| 5,394,892 | 3/1995 | Kenny et al. | 128/897 |
| 5,409,380 | 4/1995 | Balbuena et al. | 434/112 |
| 5,412,189 | 5/1995 | Cragun | 235/379 |
| 5,417,574 | 5/1995 | Raynes | 434/112 |

CPR COMPUTER AIDING

A microfiche appendix containing Lingo language source code for operating a Macintosh® computer according to the invention, consisting of 36 microfiche images on one microfiche card is filed herewith.

The invention relates to cardiopulmonary resuscitation (CPR) aiding, and, in particular to computer aiding rescue personnel conducting CPR on a subject by providing visible and intelligible audible information to the rescue personnel in response to input from the rescue personnel regarding the condition of the subject.

For background reference is made to Hutchins U.S. Pat. Nos. 4,583,524 and RE 34,800 which disclose, in a portable CPR aiding device, the use of synthetic electronic speech and microprocessor logic to help guide rescuers through CPR procedures in emergency conditions by providing audible information with the proper timing and sequencing.

For many years, personal computer and/or computer work station terminals have been used in schools, work places and other locations. Such terminals typically include a display device with graphics capability, and many have a "sound card" for producing a broad range of audio signals. Laser disk systems can be coupled to a computer for displaying high quality graphic images. Many computers are also capable of linking with other computers via hard-wire or wireless systems. For example, a local area network (LAN) may include several personal computers linked to a network server via a hard-wire connection, such as, for example, an ETHERNET® or token-ring system. Individual computers can communicate with remote computers or networks via telephone links with modem connections.

An important object of the invention is to provide CPR computer aiding for providing guidance to rescue personnel trained in CPR for resuscitating a victim under emergency conditions.

According to the invention, a computer system, such as a multimedia computer terminal, is configured as a CPR audio and visual aiding device. The terms "CPR," "CPR procedure" and "CPR techniques" as used herein embrace cardiopulmonary resuscitation, including mouth-to-mouth resuscitation and aiding choking victims. The computer terminal broadcasts audible and visible signals to allow rescuers full use of hands, eyes, voice, mouth, and body while being guided through a rescue with the proper timing for each resuscitation step. Rescue personnel can enter into an input of the computer terminal information signals representative at least of characteristics of a victim relevant to proper performance of CPR techniques. The information signals can indicate the age group of the victim, the number of rescuers present, and a selected CPR procedure. The computer processing unit responds to the information signals to output stored signals representative of proper steps to be taken in resuscitating or aiding the victim. An output, which includes a display, is responsive to the output signals and provides rescue aiding guidance signals, which include visible signals on the display, of the proper steps to be taken by the rescue personnel in resuscitating or aiding the victim. The visible signals can include a pictorial representation, which may be animated, of a rescuer practicing the proper steps on a victim. The output can further include an electroacoustical transducer responsive to the output signals for providing audible intelligible signals representative of the proper steps, and synchronized with the visible signals.

According to another aspect of the invention, a peripheral unit, such as, for example, a multimedia computer terminal, can be networked with other peripheral units, each having an input for entering the information signals and an output that includes a display. In one configuration, a network server responsive to the information signals provides output signals representative of the proper steps to be taken in resuscitating or aiding the victim. A communication link communicates the information signals from the peripheral units to the network server and the output signals from the server to the peripheral unit sending the corresponding information signal. In response to the output signals, the output of the peripheral unit provides guidance signals, including visible guidance on the display, representative of the proper steps. The visible guidance can be synchronized with audible intelligible guidance broadcast by an electroacoustic transducer.

According to yet another aspect of the invention, CPR aiding guidance signals are stored in a computer readable medium coupled to the computer system. The computer readable medium could be, for example, an integrated circuit memory, a tape cassette, a hard disk drive, a floppy disk, an optical disk, a bubble memory, a CD-ROM, and the like.

According to still another feature of the invention, the output display monitor of the terminal displays a menu, for example, in the form of a touch keypad, with which the rescuer could input the information signal via, e.g. a mouse, a touch-screen, keystrokes on a keyboard, and the like. This menu/keypad can be divided graphically by the age category of the victim, such as Adult, Baby, and Child. It can be further divided into rescue procedures, such as One Rescuer CPR, Two Rescuer CPR, Mouth to Mouth Resuscitation, Choking Conscious, and Choking Not Conscious procedures.

Another feature of the invention is that it enables the rescuer to quickly change the CPR aiding prompts by entering new information signals should the condition of the victim or number of rescuers change.

According to yet another feature of the invention, the computer system is configured to permit rescue personnel to select the language of the intelligible audible signals, thus allowing for international availability and use, the system being capable of supporting different languages.

According to another aspect of the invention, the CPR aiding computer system further includes a screen saver computer program. The CPR aiding screen saver keeps pixels active on the screen during idle moments so that CPR computer aiding will be instantly available from the computer terminal by entering a simple command, for example, entering a keystroke.

According to still another aspect of the invention, the CPR aiding computer system is configured to furnish a diary of a rescue. The diary may include information entered by rescue personnel, information recorded automatically by the computer processor or network server, or both.

In still another feature of the invention, the CPR aiding computer system is configured to furnish an accurate run time of the rescue on the computer video display terminal. Upon rescue personnel entering the information signals at the start of a rescue, a window on the computer screen could show the elapsed time. For example, the computer screen could show a stop watch timer or a digital display of the elapsed time.

According to another aspect of the invention, an article of manufacture includes a computer usable medium that has a computer readable program code embodied therein for providing guidance signals to rescue personnel trained in CPR under emergency conditions for aiding a victim. The computer readable program code in the article of manufacture includes computer readable program code for causing a computer to display visible signals representative of proper steps to be taken by the rescue personnel in resuscitating the victim in response to an information signal input by the rescue personnel. The information signal is representative at least of characteristics of the victim relevant to proper performance of CPR techniques.

According to yet another aspect of the invention, a computer program provides guidance signals to rescue personnel trained in CPR under emergency conditions for aiding a victim requiring CPR techniques. The computer program is stored on a media readable by a general purpose computer, and configures the computer upon being read and executed by the computer to perform functions that include allowing the rescue personnel to input an information signal representative at least of characteristics of the victim relevant to proper performance of CPR techniques, and displaying visible signals representative of proper steps to be taken by the rescue personnel in resuscitating the victim in response to the information signal input by the rescue personnel.

A further feature of the invention is to use a bridge that links two local area networks together so they can share CPR aiding software. A more sophisticated bridge that could be used is a router or a cross between a bridge and router which is a brouter. All can be used to perform some of the same functions for the CPR network.

Computers and computer terminals are already in place in locations available to persons trained for CPR rescues. The CPR aiding computer system of the invention can be implemented in many of these systems by simply loading a CPR aiding computer program into a computer memory. CPR prompting is a small adjunct to the principal use of the computer terminal which may be, for example, accounting, engineering, entertainment, or education. Such general purpose computers, when configured according to the invention, can furnish instant access to CPR speech and visual prompting. Computer networks provide a means for distributing access to CPR aiding to remote locations.

Numerous other features, objects, and advantages of the invention will become apparent from the following specification when read in connection with the accompanying drawings in which.

Figure 1:
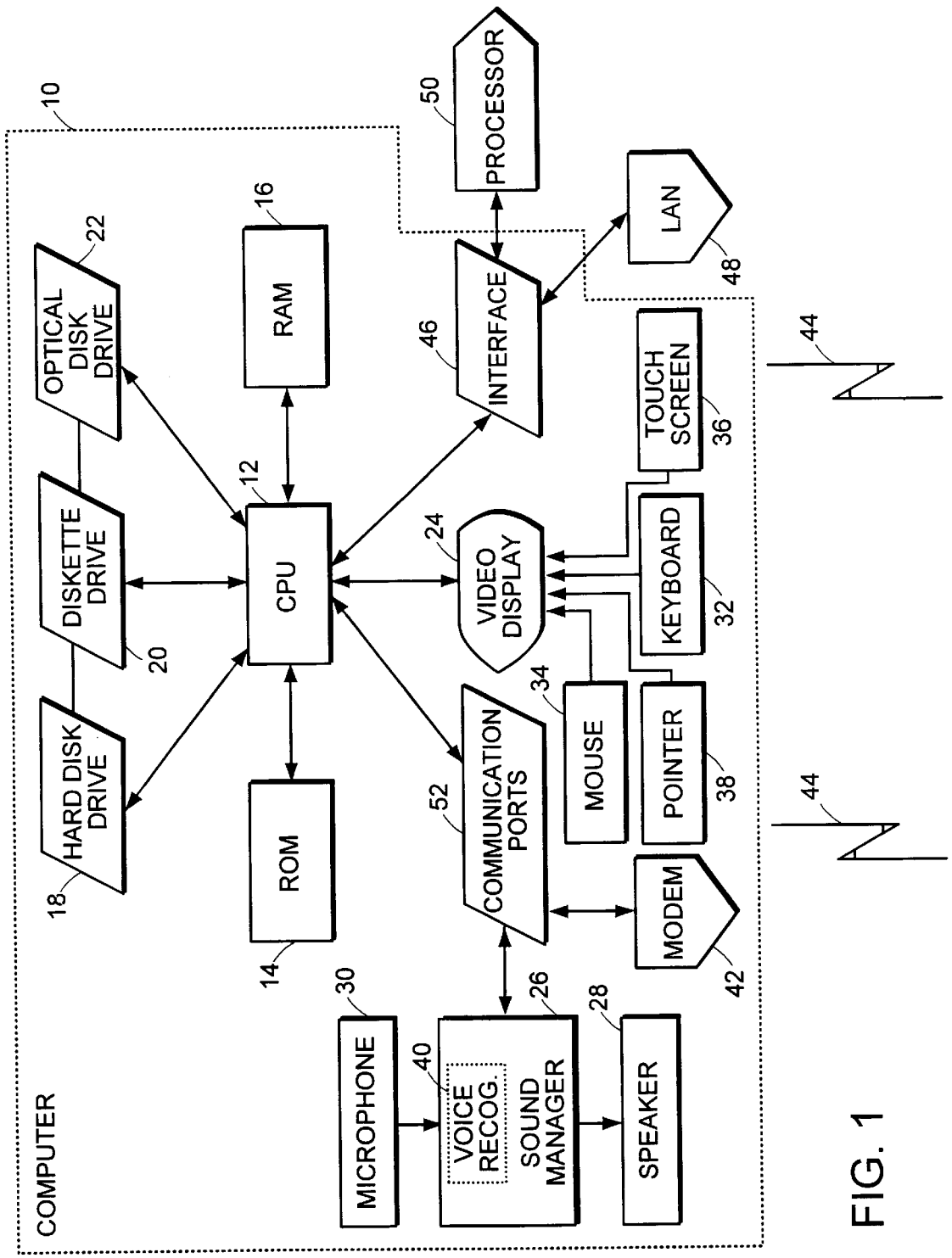
FIG. 1 is a block diagram of a CPR aiding computer according to the invention.

With reference now to FIG. 1, a multi-media personal computer 10 configured according to the invention includes a central processing unit (CPU) 12 that is operatively coupled to read only memory (ROM) 14 and random access memory (RAM) 16. CPU 12 is also coupled to one or more data storage systems for accessing computer readable media, such as, for example, hard disk drive 18, diskette drive 20, laser disk drive 22, and the like. At least one of the data storage systems also typically has the capability to write data onto the computer readable medium. Personal computer 10 has a display 24 capable of displaying graphic images and text, and a sound manager system 26 capable of speech synthesis. Sound manager system 26 is coupled to a speaker 28 and a microphone 30. Computer 10 also includes one or more input devices, such as, for example, a keyboard 32, a mouse 34, a touch screen 36, a screen pointer 38 and, in an exemplary configuration, a voice recognition device 40, which may form a part of the sound manager system 26. Computer 10 may also include one or more interfaces for communicating with another computer or a computer network. The interfaces may include, for example, a modem 42 for communication via a telephone system 44, a hard-wire interface 46, such as an ETHERNET® or a token-ring interface, to a local area network (LAN) 48 or may be any other type of computer communication interface now known or to be developed in the future. The LAN 48 may, in turn, be able to communicate with more remote units via a telephone system 44 or other type of long distance communication system. Interface 46 may also connect computer 10 to another processor 50 for parallel processing information. Devices such as modem 42 and sound manager 26 typically couple to CPU 12 via communication ports 52 built into computer 10.

The telephone system 44 may include links over hard-wired connections, e.g. via copper cable or optical fibers, and wireless connections, e.g. via cellular phone systems or via satellite radio links. Computer system 10 can also be connected to the Internet via a modem 42 connection to the telephone system 44.

CPU 12 is connected to and controls the sound manager 26 by selecting digitized sound signal data stored in memory and passing them to sound manager 26. Sound manager 26 passes the digital sound signal data through a synthesizer and digital-to-analog (D/A) converter and thereafter through a sound processor. At this point, the sound signals can be broadcast as speech through speaker 28 or sent through a bus, or network to be used with graphics to provide CPR speech prompting.

Another method to input and output sound is through the serial ports 52 in the form of MIDI (Musical instrument data interface) signals. MIDI signals differ from signals moving through the sound ports in that they are digital, rather than analog. Because they are digital, selected portions of the MIDI signals can be random-accessed.

Graphic files containing images and text can be created using a variety of commercially available products. Graphic images and text can be stored in separate files in computer memory and randomly accessed to provide the current CPR prompting illustration. These sequenced images receive the proper geometry, plus color, and are processed through a graphic processor, such as a Quick Draw® processor for Macintosh computers, for subsequent display on video display 24. Chroma-keying instruction text can be used over graphics and video to achieve greater emphasis with the visual CPR prompt.

Figure 5:
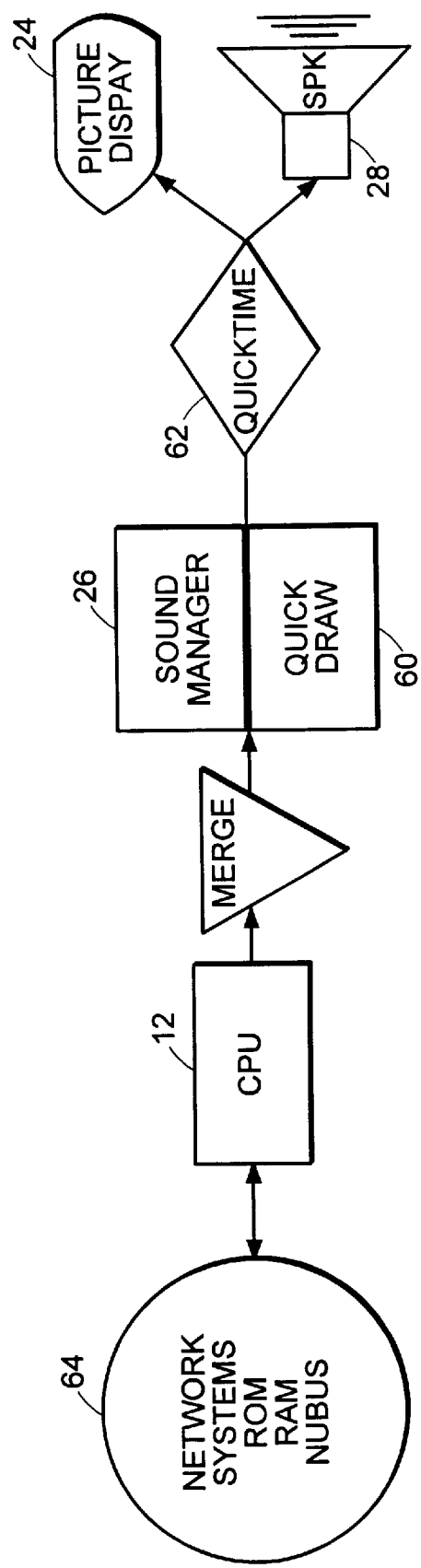
FIG. 5 is a functional block diagram illustrating synchronization of animated image and intelligible audible prompts in a coordinated format.

FIG. 5 is a logical diagram illustrating the steps in coordinating the CPU 12, the sound manager 26, and Quick Draw processor 60. A circuit called the quick time extension 62 synchronizes the graphics and sounds for display on video display 24 and broadcast over speaker 28. In this way, CPR audible and graphic guidance signals are synchronously output from computer 10. The guidance signals can also be communicated to other devices 64, such as locations over a network or a local storage device for future use. Once created, the sound and image files may be duplicated for distribution and altered to fit both the needs, display means, and culture of any group.

A computer program, features of which will be described later in greater detail, for providing guidance signals to rescue personnel trained in CPR for aiding a victim requiring CPR techniques under emergency conditions is stored in any of hard disk 18, diskette 20, optical disk 22, or any other computer readable storage medium coupled to CPU 12. The program may also be stored in a remote system (not shown in FIG. 1) coupled to computer 10 via communication interface 36.

Reproduced in the microfiche appendix which constitutes a portion of this specification are portions of an exemplary computer program code according to the invention. The program causes a computer to display visible signals and produce intelligible audible signals representative of proper steps to be taken by rescue personnel in resuscitating an infant or an adult victim in response to information signals furnished by the rescue personnel, wherein the information signals are representative of characteristics of the victim relevant to proper performance of CPR techniques. The program, is written in LINGO, an object oriented language which combine graphics, sound and text for multi-media systems, and is adapted to operate on a Macintosh® 8100 computer. The program incorporates graphic, sound and text files, which can be easily created with commercially available tools, such as, for example, graphic files created with Adobe Photoshop®, by those of ordinary skill in the art. Image and sound files may be stored separately from the program. For example, image files may be stored on an optical disk accessible with optical disk drive 22, while the program is stored on hard disk drive 18 and loaded into RAM 16 when the program is initialized. Program code for causing a similarly configured computer to provide guidance signals for resuscitating a child victim or for performing different resuscitation steps on infant or adult victims can be created in a similar manner by those of skill in the art.

Figure 2:
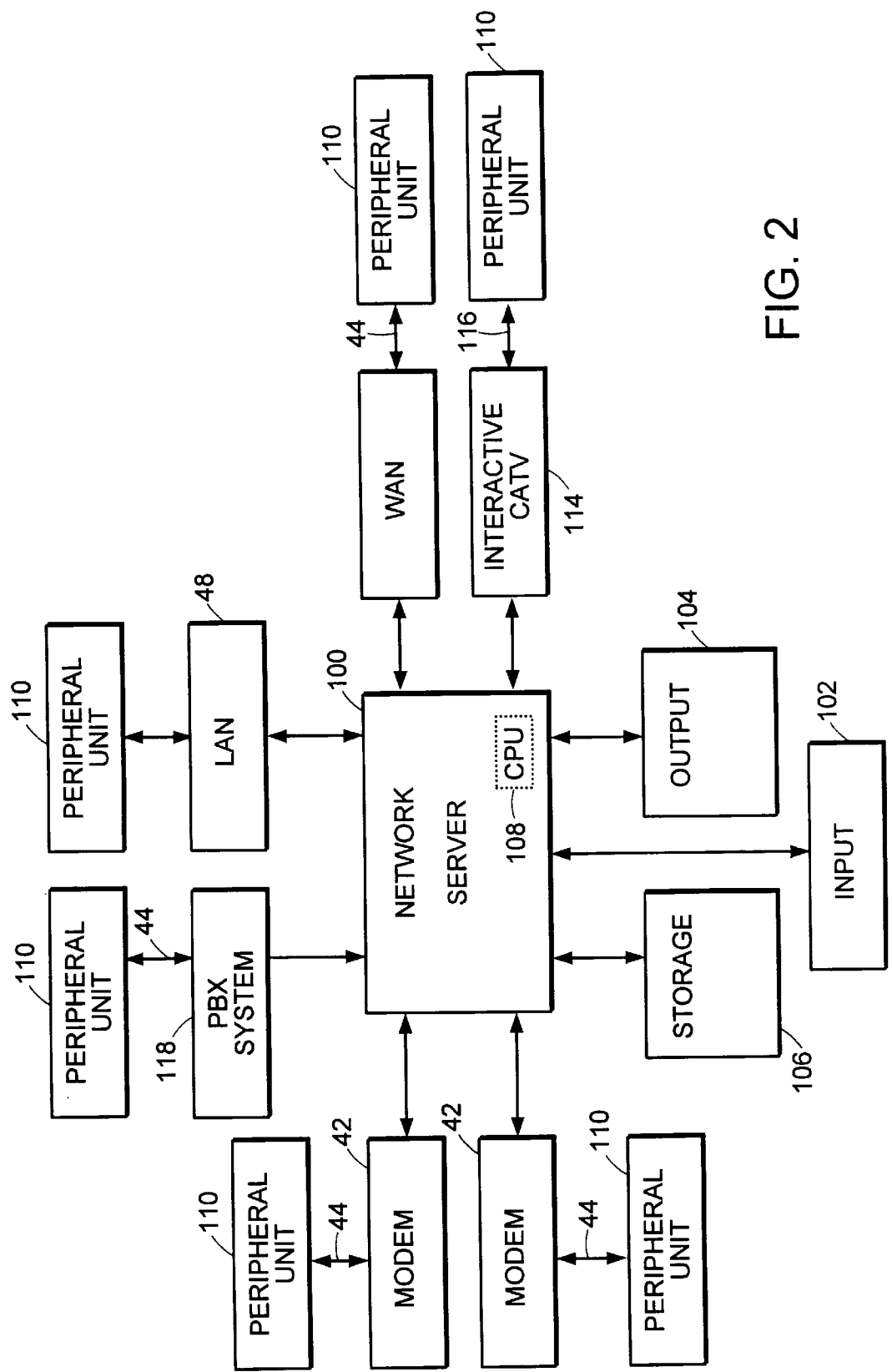
FIG. 2 is a block diagram of a CPR aiding computer network according to the invention.

Referring now to FIG. 2, a networked CPR aiding computer system for providing guidance to rescue personnel trained in CPR for resuscitating a victim under emergency conditions includes a network server 100 coupled to an input device 102, such as a keyboard or the like, an output device 104, such as a printer or video monitor or the like, and a storage device 106, such as a disk drive and the like, through which the network server 100 can access information written on a computer readable medium. A CPR aiding computer program, providing the same functions as the CPR aiding program described above with reference to FIG. 1 for multimedia computer system 10, and adapted for use on a computer network is stored in storage device 106. Network server 100 includes a CPU 108 that controls operation of the networked system and that runs the CPR aiding program.

Network server 100 is coupled to peripheral units 110, which each include an input device for entering, during operation of the CPR aiding program, information signals representative at least of characteristics of a victim relevant to proper performance of CPR techniques and an output that has at least a display. Network server 100 is responsive to the information signals and provides output signals representative of proper steps to be taken in resuscitating the victim. The output of the peripheral unit provides guidance signals in response to the output signals, wherein the guidance signals include visible guidance on the display representative of the proper steps to be taken by the rescue personnel in resuscitating the victim.

Network server 100 communicates with the peripheral units via a communication link, which can take a variety of forms. Peripheral units 110 can communicate with network server 100 via modem connections 112 over telephone networks 44, via an interactive CATV system 114 over coaxial cable 116, via a wide area network (WAN) connection 116, for example the internet, over a telephone network 44, via a LAN 48, via a wireless PBX system 118, or the like. Generally, Apple Corp. Macintosh networks use a type of switch called a Router, although such an Apple system could connect through many types of digital switches or through the airwaves with infrared wireless signals.

The peripheral units 110 can be configured with a wide variety of different types of hardware. For example, peripheral units 110 may be configured similarly to multimedia computer system 10, as described above with reference to FIG. 1. They may also be configured as remote terminals, without their own CPU 12. A peripheral unit 110 may be installed in a mobile emergency medical unit (not shown), such as those staffed by emergency medical technicians in many communities, and communicate with a network server 108 located in, for example, a fire station or hospital, via a mobile radio or cellular telephone link. A peripheral unit 110 linked to network server 100 via an interactive CATV system 114 may use an ordinary television as a video monitor and loudspeaker, and an interactive CATV keypad or equivalent device for an input. In exemplary configurations, the peripheral units may include an electroacoustical transducer responsive to the output signals for providing audible guidance of the proper steps to be taken by the rescue personnel in resuscitating the victim and synchronized with the visible guidance. Many other configurations of peripheral units 110 and communication links with network server 100 are possible within the invention.

Apple Corp. Macintosh networks can include a local group of printers and personal computers and can include hundreds of Macs, PC's, printers, and dedicated file, mail, and database servers. Large networks require special network devices such as hubs and routers to control the data running over the cables. Network data can travel over several types of wire cables, as well as over optical cables for high-quality, ultrasecure networks. Radio wave wireless networks may also be used.

The operation of the CPR aiding computer program will now be described in greater detail. The CPR aiding program can be adapted for use on an individual computer system 10 as described above with reference to FIG. 1, and can also be adapted for use on a network server 100 for serving remote and local peripheral units 110. Those of ordinary skill in the art can adapt interactive programs written for individual computers for network use, therefore the features of the CPR aiding program will be described with reference to application for a stand-alone computer system 10 as illustrated in FIG. 1.

In an emergency situation, such as, for example, when a victim is not breathing, choking while conscious, or choking while unconscious, a person previously trained in CPR techniques who is near the victim and a computer terminal, such as multimedia system 10, can initiate the CPR aiding program by, for example, toggling a key on keyboard 32. In a windows type of operating system having a CPR aiding icon displayed on the video display 24, the rescuer may initiate the CPR aiding program by clicking on the icon with mouse 34, touching the icon if the system has a touch screen 36, by pointing to the icon with pointer 38, or the like. Or, in another embodiment, the rescuer can initiate the program by a vocal command to microphone 30, which is communicated to CPU 12 through voice recognition device 40. The remainder of the discussion of the CPR aiding program features will describe entering information by use of the touch screen 36 and keyboard 32, but it will be understood that, depending upon the actual configuration of the computer system 10, the mouse 34, pointer 38 and microphone 30 can also be used for entering information.

Figure 3:
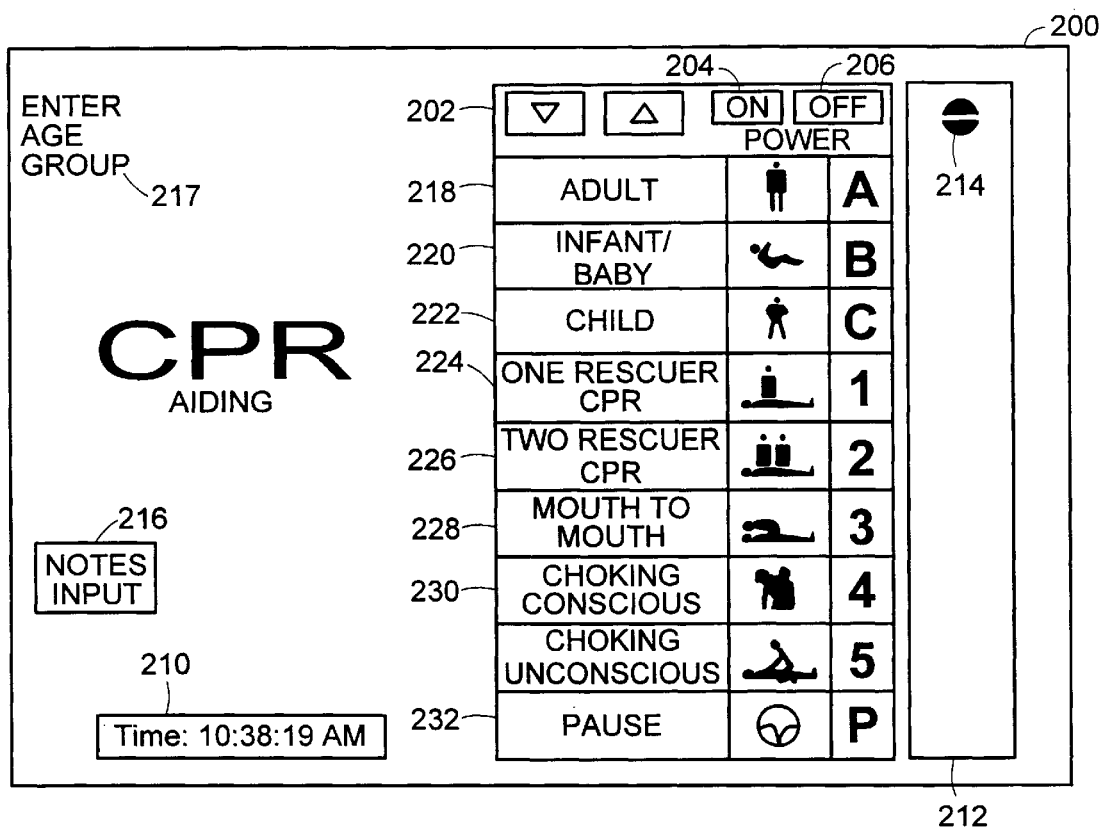
FIG. 3 is an initial display screen according to the invention.

Upon initiating the CPR aiding program, CPU 12 loads the program into RAM 16, and puts an initial screen 200 on video display 24, as illustrated in FIG. 3. Initial screen 200, and all other screens, are advantageously stored on a computer readable storage medium that can be quickly accessed, such as, for example, an optical disk. Much less RAM 16 is needed in such a configuration, since all screens do not have to be resident in RAM 16 during operation of the CPR aiding program.

Initial screen 200 has a display of a selection keypad 202 for entering information signals representative at least of characteristics of the victim relevant to proper performance of CPR techniques. In one embodiment, the selection keypad 202 is displayed during operation of a screen saver program, and the CPR aiding program can be entered, for example, by touching the "ON" 204 near the top of keypad 202. Touching "OFF" 206 exits the CPR aiding program in either configuration. Initial screen 200 can also include product indicia 208 and a digital time display 210. To the right of keypad 202 is a selection indicator area 212. Near the top of the selection indicator area 212 an on icon 214 indicates that the CPR aiding program is running. The initial screen 200 may advantageously include an area for notes input 216 which, when touched by the rescue personnel, initiates recording a record of the rescue on the computer 10. Text 217 is displayed to urge the rescuer to enter information relating to the age group of the victim, and may also be used to prompt user input regarding the rescue procedure to take place.

The rescuer then enters the victim age group and rescue procedure information by touching appropriate portions of the keypad 202. For example, keypad 202 has areas indicative of three victim age groups, adult 218, child 220 and infant/baby 222, which are labeled on the keypad 202 with letters "A" "B" and "C." Keypad 202 also has areas indicative of procedures for one rescuer CPR 224, two rescuer CPR 226, mouth-to-mouth resuscitation 228, victim choking and conscious 230, and victim choking and unconscious 232, which are labeled "1"–"5," respectively, on the keypad. There is also a pause area 232 at the bottom of keypad 202 for interrupting a sequence of guidance signals. This area is labeled on keypad 202 with the letter "P." Each area also includes a text description and a graphic icon. A keypad that is similar to keypad 202, but that is a physical keypad rather than a video image keypad, is described in Reissue Patent No. RE 34,800, which is incorporated herein by reference.

The CPR aiding program leads the rescuer through a sequence of steps for performing rescue techniques on the victim by providing visible guidance signals on video display 24 and voice guidance signals through speaker 28.

Figure 4A:
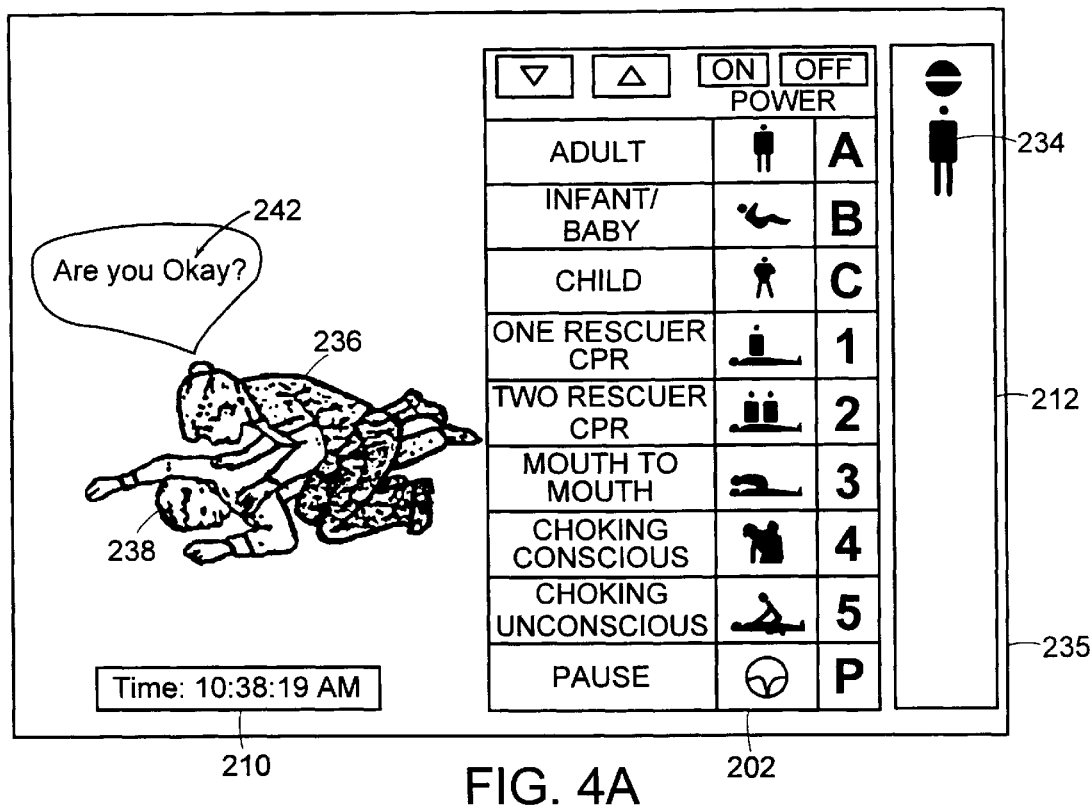
FIGS. 4A-4P are illustrations of output screens displaying graphic CPR prompts.
Figure 4B:
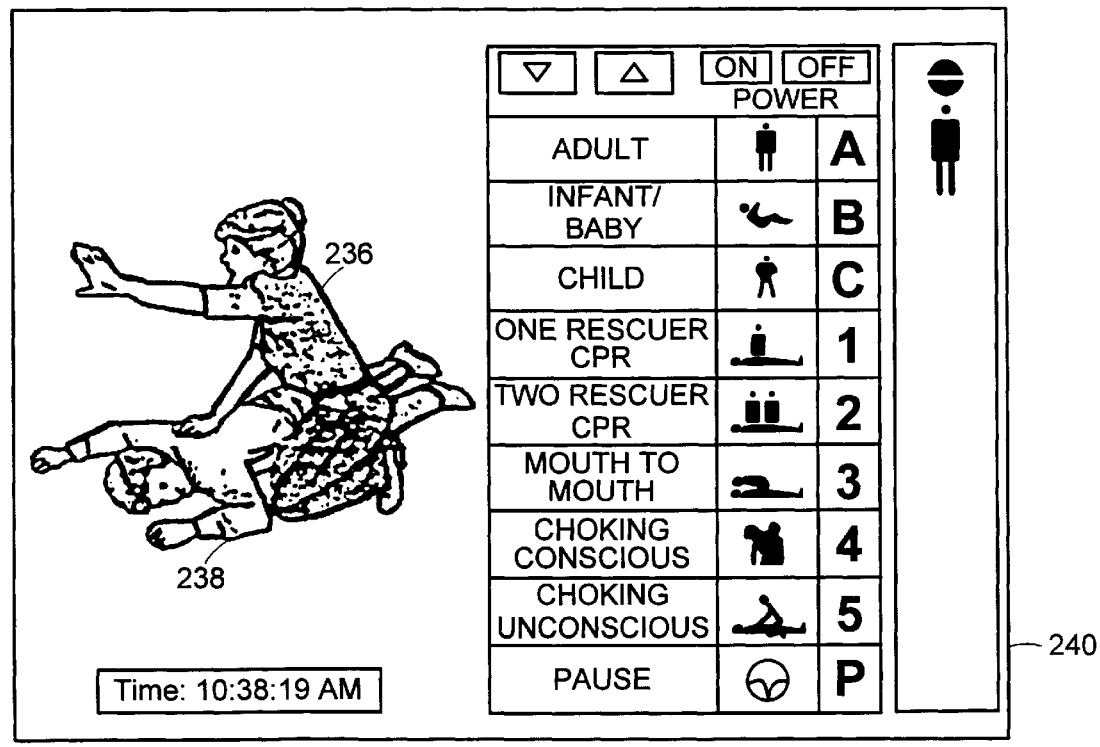
Figure 4C:
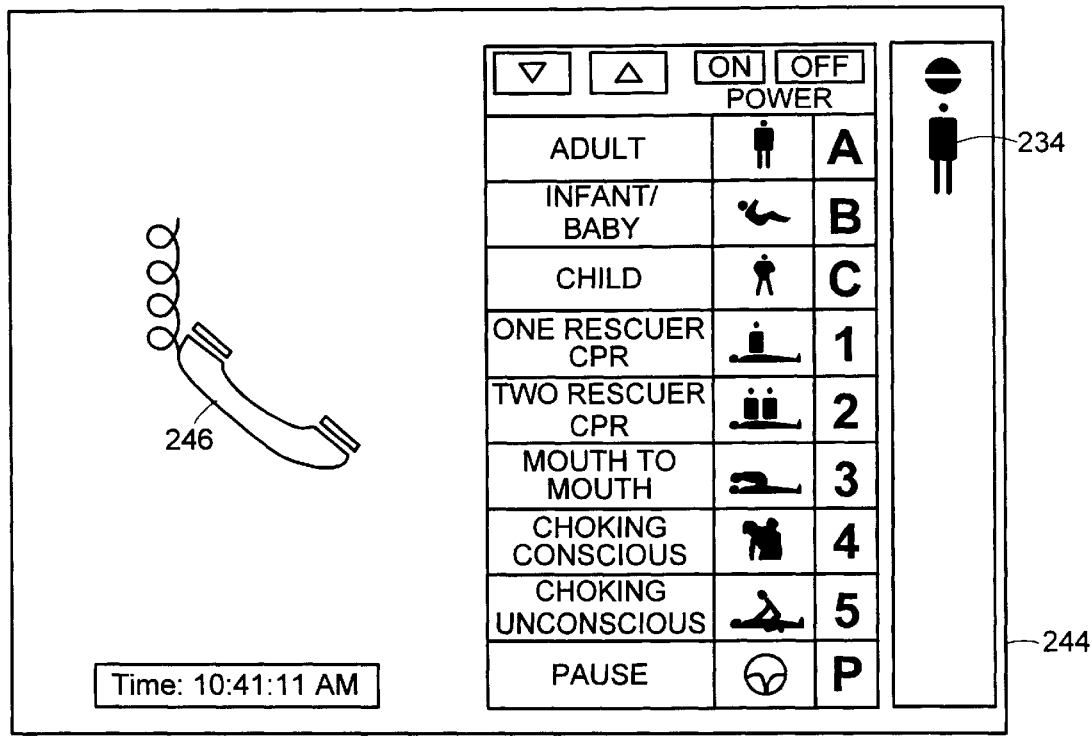
Figure 4D:
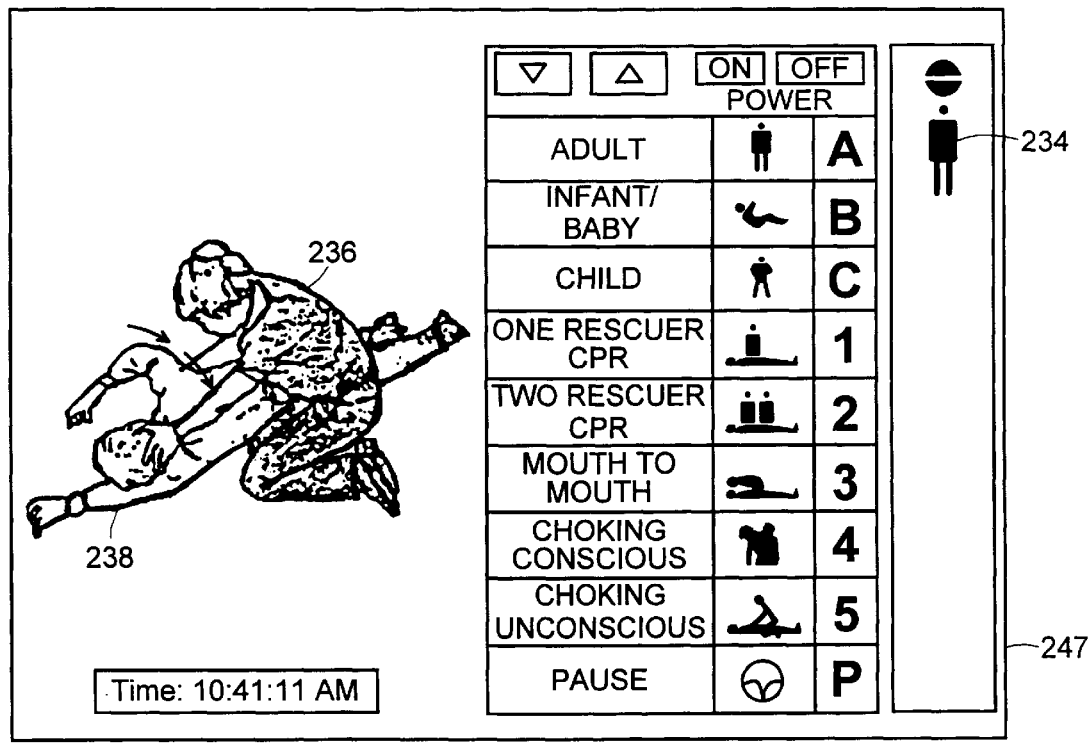
Figure 4E:
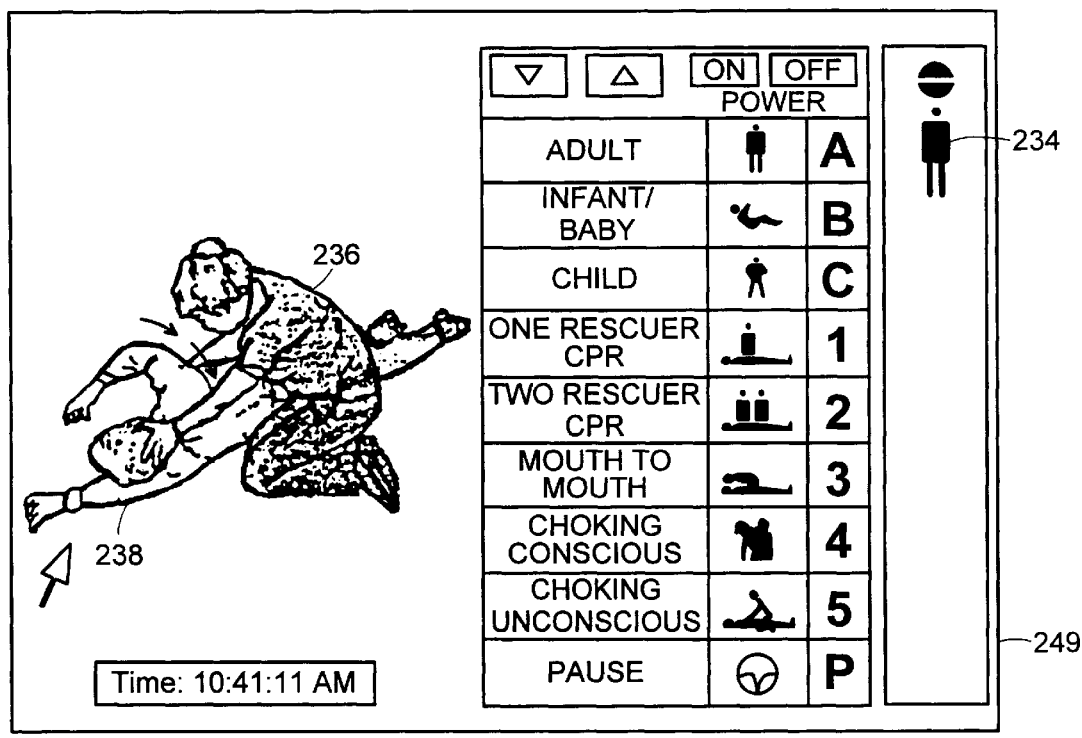

Referring now to FIGS. 4A–4E, a rescuer first inputs the victim age group by touching one of the three age group areas 218, 220, 222. This action sends a signal to CPU 12, which responds with an icon output signal to display 24 that puts an icon of the selected age group, in this case an adult icon 234, in the selection area 212 of screen 235. Once the age group is selected, the CPR aiding program stays with this path and provide the adult icon 234 display on all subsequent screens until a different age group is input, for example, if a mistake had been made in the earlier choice. CPU 12 may also provide an image output signal that puts an animated sequence of graphic images on the display 24 of a rescuer 236 checking a victim's 238 condition (screen 235 in FIG. 4A) and asking for someone to provide assistance (screen 240 in FIG. 4B). CPU 12 may, in conjunction with causing display of the animated images, provide a voice output signal that causes the sound manager 26 to broadcast voice guidance through speaker 28, the voice guidance being synchronized with the graphic images. The graphic images can also include text guidance 242 synchronized with the voice guidance, as illustrated in FIG. 4A. FIG. 4C shows a screen 244 with a telephone image 246, prompting the rescuer 236 to get someone to call for help. Screens 247 and 249 in FIGS. 4D and 4E, respectively, include visible guidance that illustrate the proper technique for turning the victim 238 over to further assess victim condition.

Once the actual victim's condition has been assessed, the rescue personnel touches one of the five keypad rescue procedure areas: one or two person CPR 224, 226, mouth-to-mouth 228, choking conscious 230 and choking unconscious 232. This causes the icon for the selected procedure to be displayed in the selection area 212. The selection also causes the CPR aiding program to initiate the appropriate sequence of synchronized visible and audible guidance for guiding the rescue personnel through proper steps of the selected rescue procedure. The human figures of the display graphics will move with the correct procedures synchronized with the audible guidance.

Figure 4F:
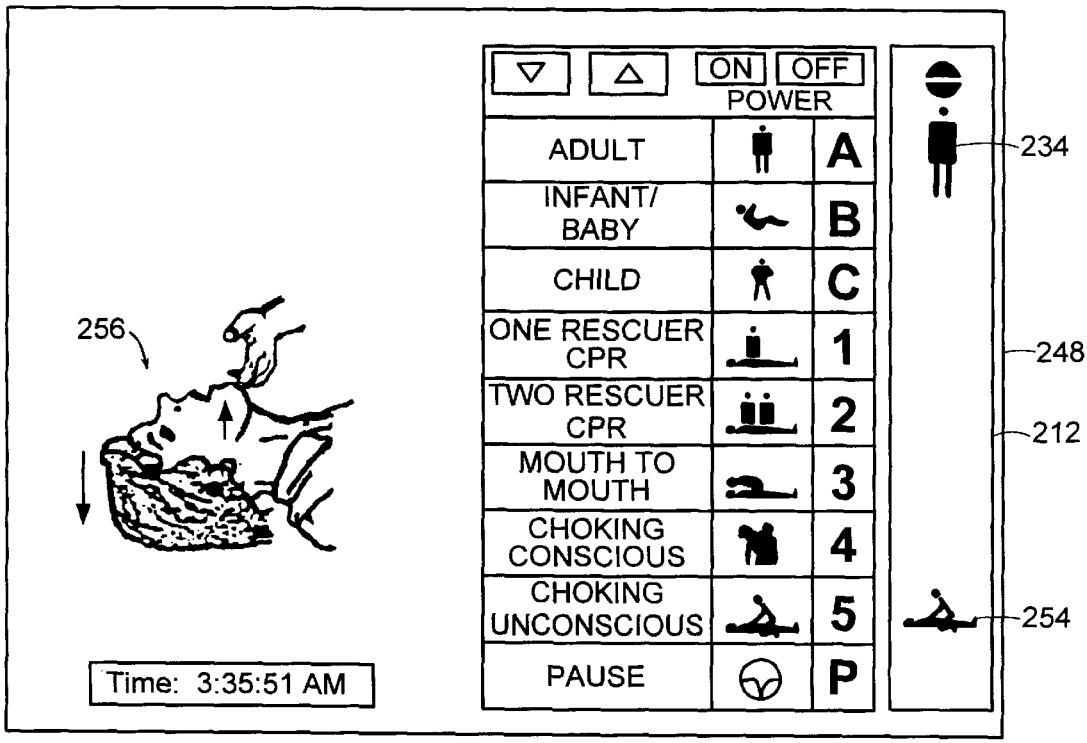
Figure 4G:
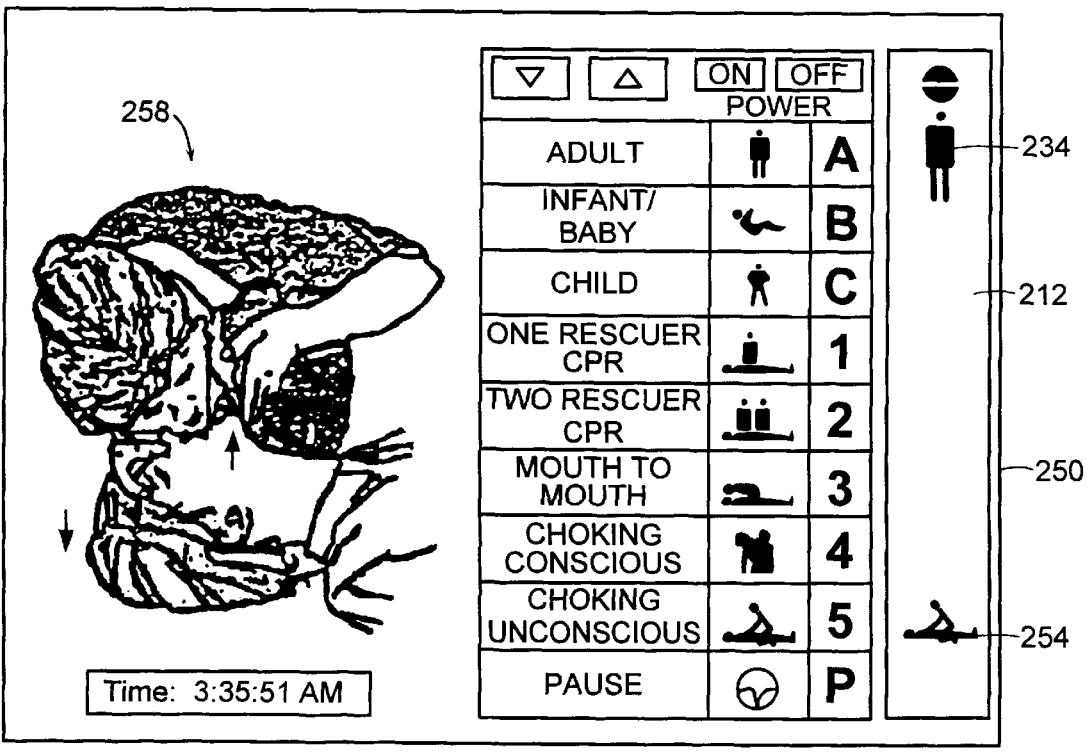
Figure 4H:
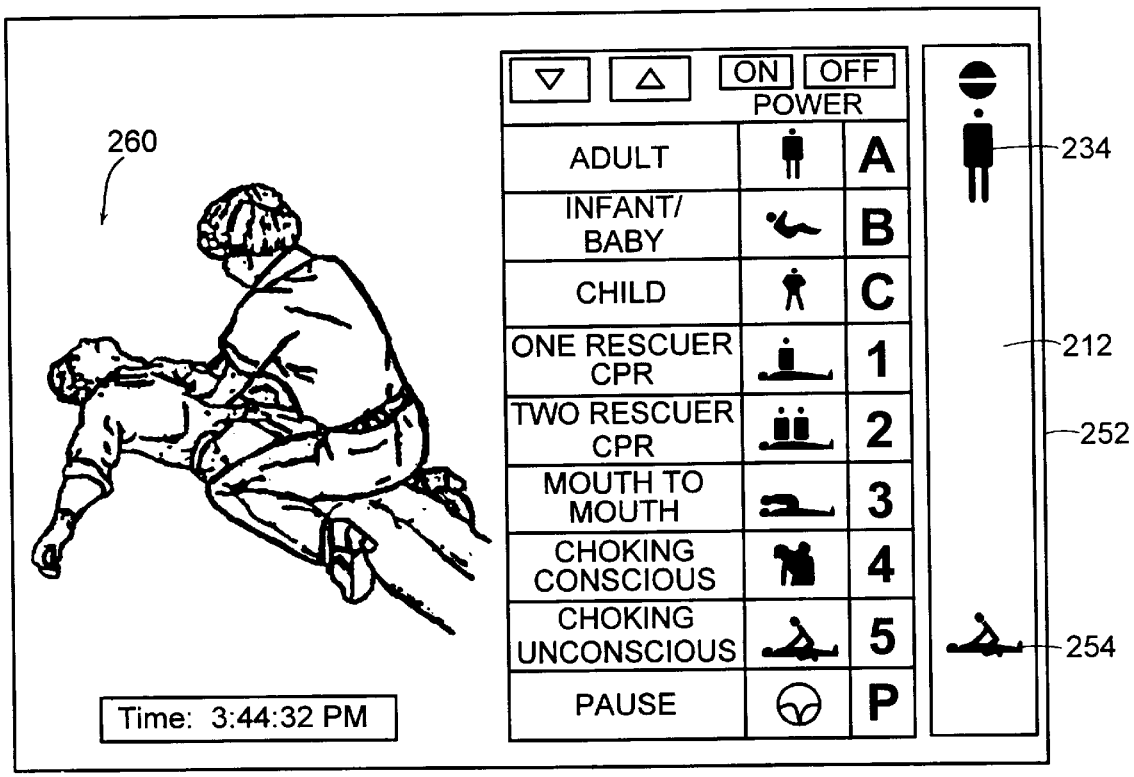

In FIGS. 4F–4H, screens 248, 250 and 252 show three of a sequence of visible guidance for guiding a rescue person to perform the proper rescue techniques for an unconscious adult choking victim. Each screen 248, 250, 252 displays the adult icon 234 and a choking unconscious icon 254 in selection area 212. Screen 248 in FIG. 4F includes a visual guide 256 for tilting the victim's head back. Screen 250 in FIG. 4G includes a visual guide 258 of a rescuer 236 checking the victim's 238 airway. Screen 252 in FIG. 4H includes a visual guide 260 of proper rescuer hand placement for prompting a further step in the rescue procedure.

Figure 4I:
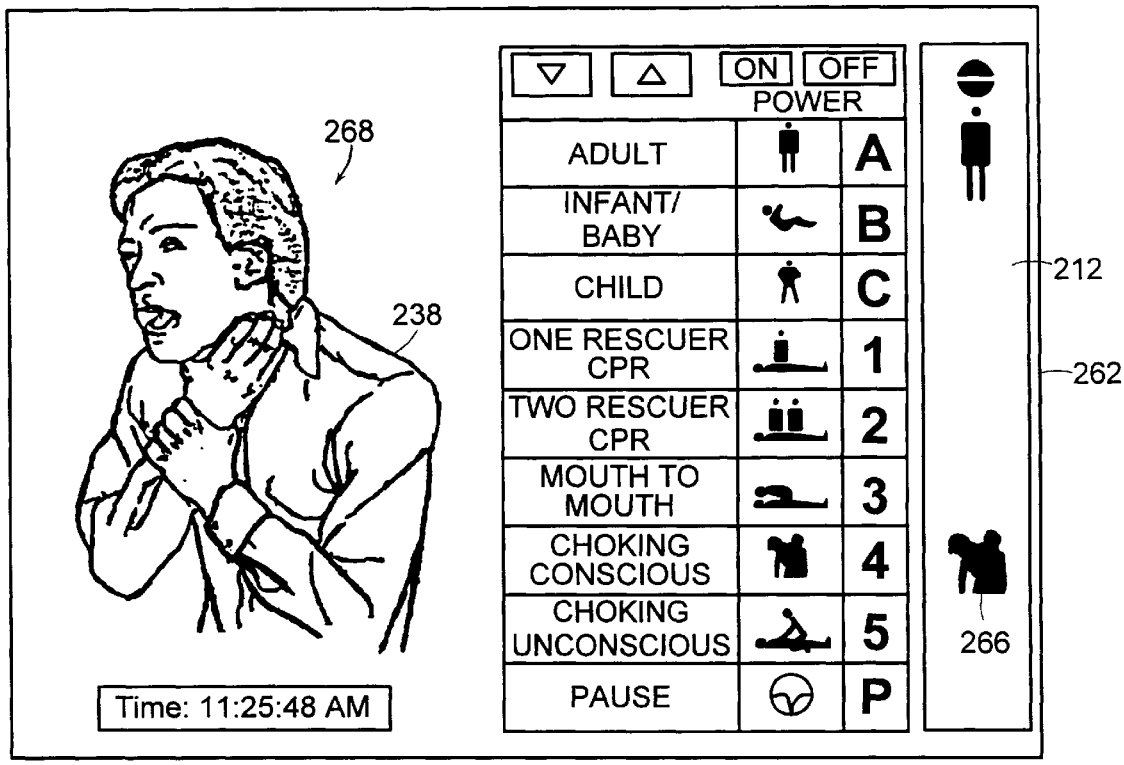
Figure 4J:
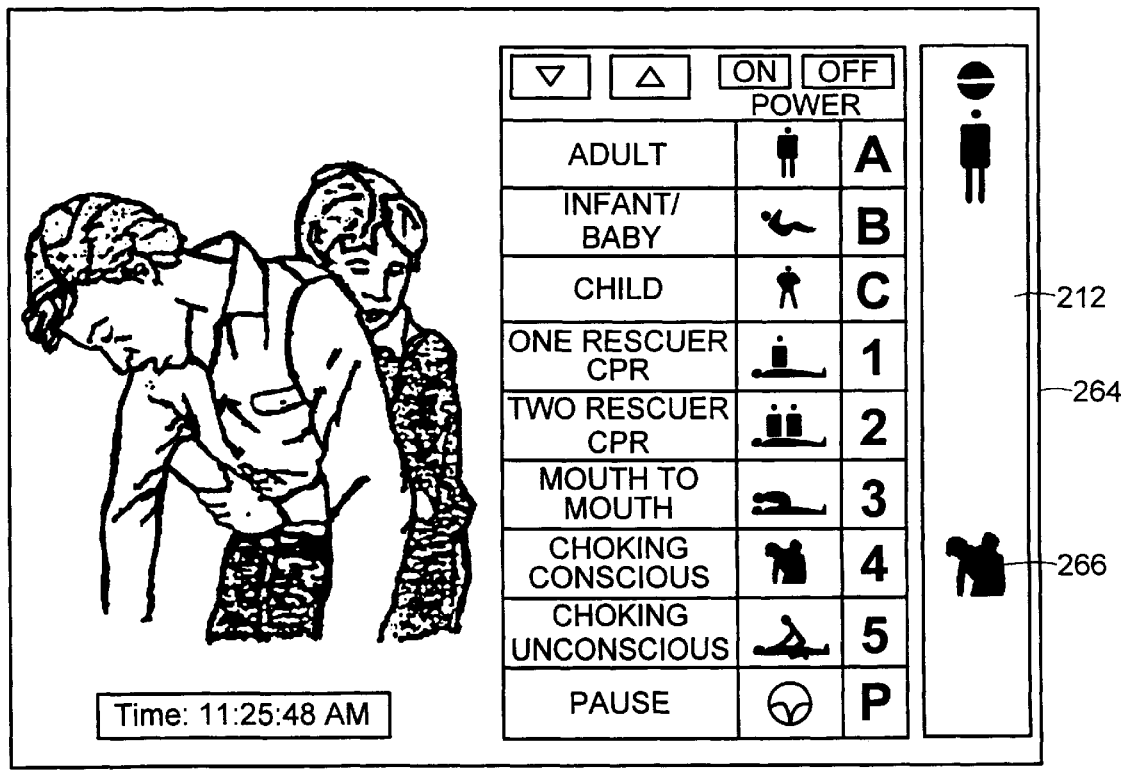

FIGS. 4I and 4J illustrate two screens 262, 264 of a sequence of screens including visual guidance for a rescuer to perform the proper rescue techniques on a conscious adult choking victim. Each screen 262, 264 includes a choking conscious icon 266 in selection area. Screen 262 includes a visual guide 268 of a victim 238 choking. Screen 264 includes a visual guide 270 of proper positioning of the rescuer's 236 hands for performing the Heimlich maneuver.

Figure 4K:
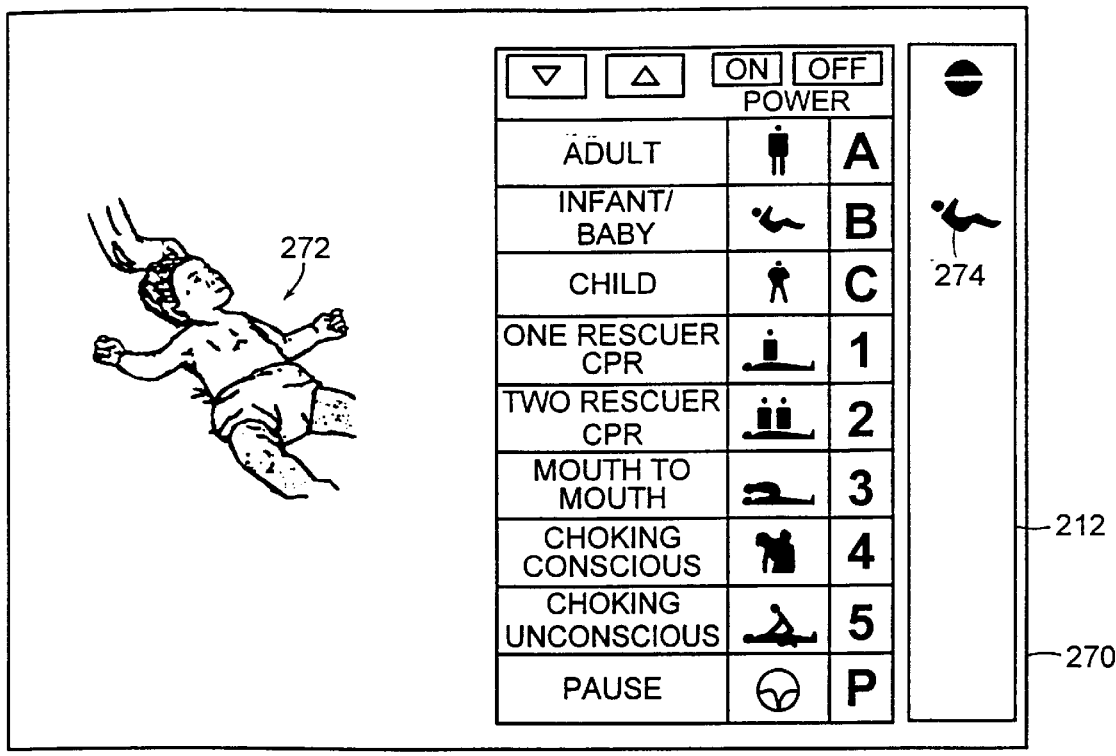

FIGS. 4K shows a screen 270 with a visual guide 272 for assessing the condition of an infant or baby. The infant/baby icon 274 is displayed in the selection area 212.

Figure 4L:
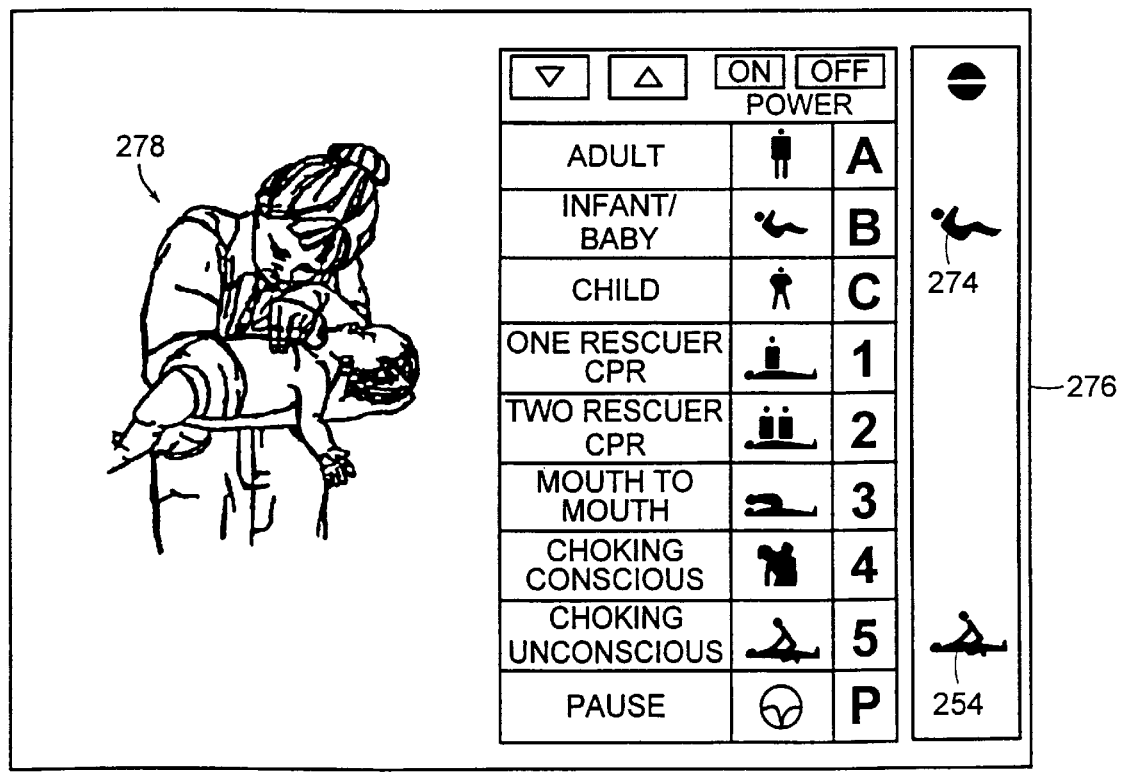

Screen 276 in FIG. 4L has a visible guide 278 of proper steps for rescuing a choking unconscious baby.

Figure 4M:
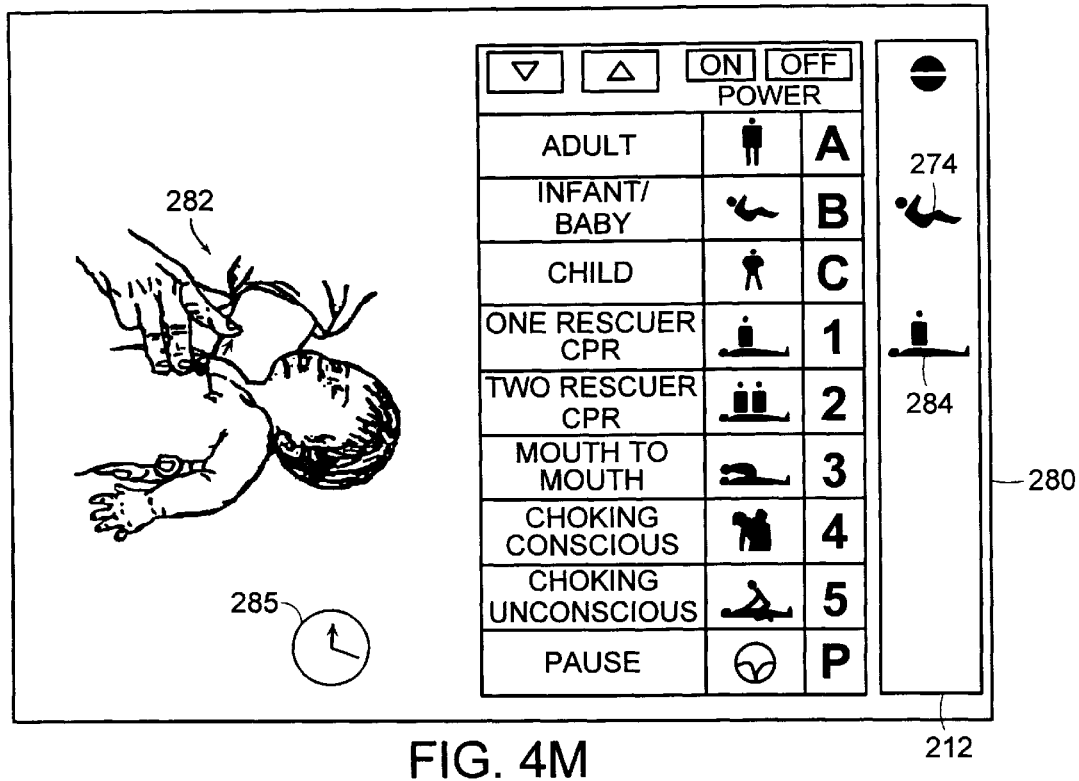

Screen 280 in FIG. 4M includes a visible guide 282 of a proper step in one rescuer CPR being performed on a baby. The one rescuer CPR icon 284 is displayed in the selection area 212. A stopwatch image 285 is displayed to keep rescue personnel aware of the elapsed time since the start of the intervention or from the start of the rescue procedure. It is helpful for a rescuer to know the time since cardiopulmonary resuscitation was started to relay the information to medical personnel.

Figure 4N:
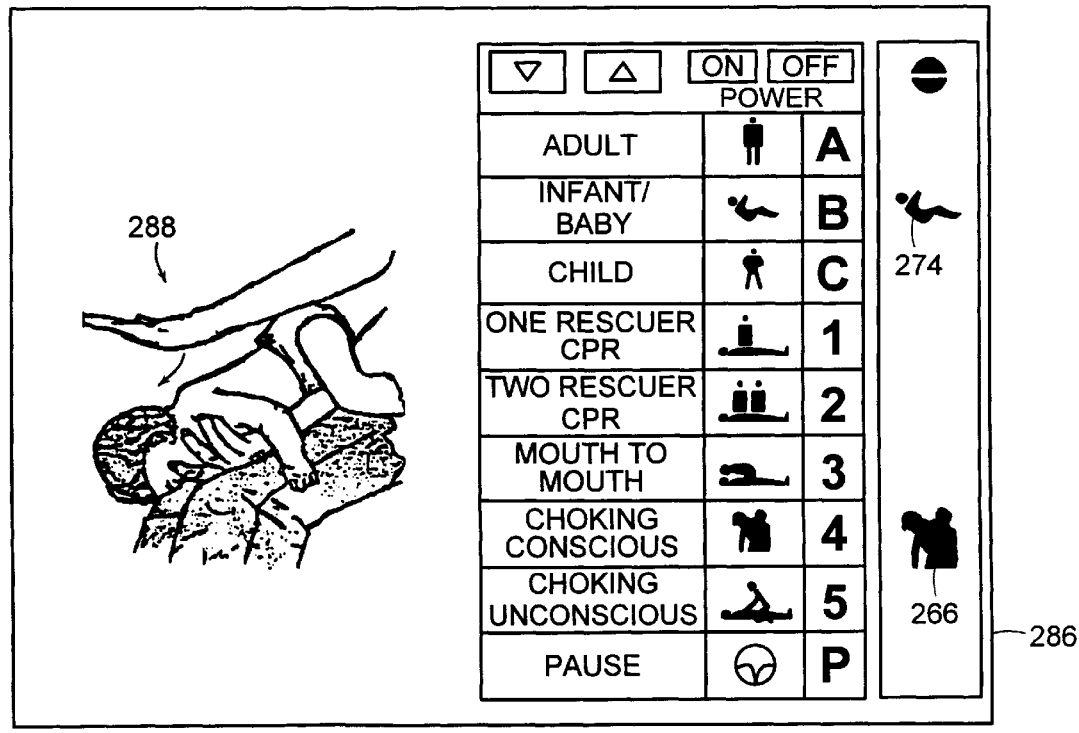

Screen 286 in FIG. 4N has a visible guide 288 of a proper step in rescuing a choking conscious baby.

Figure 4O:
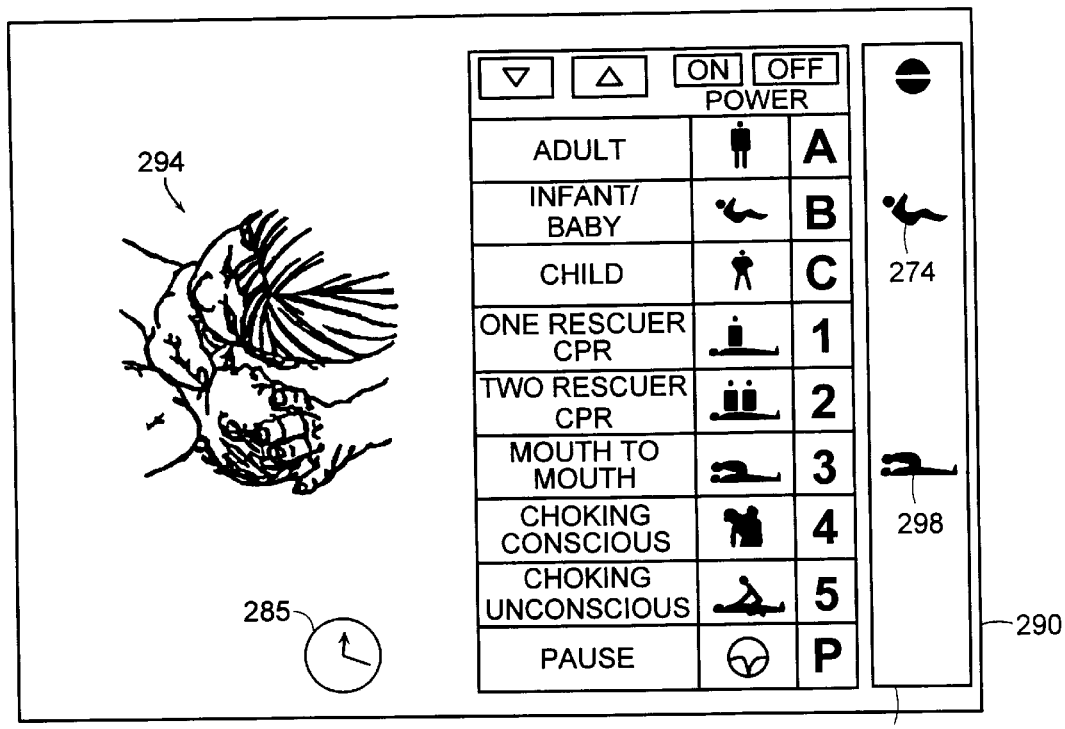
Figure 4P:
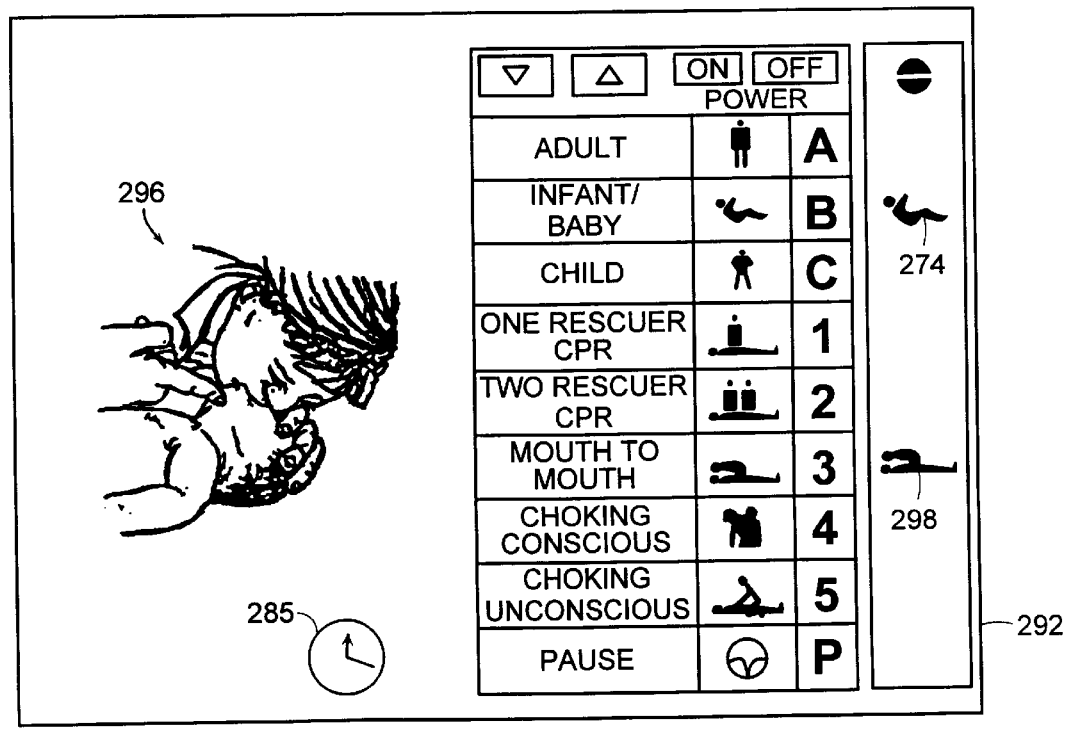

Screens 290 and 292 in FIGS. 4O and 4P, respectively, show corresponding visible guides 294 and 296 for mouth-to-mouth resuscitation on a baby. The mouth-to-mouth icon 298 is displayed in the selection area 212.

As mentioned above, the CPR aiding program is preferably configured to record a notes file for providing a record of a sequence of the information signals, the output signals and additional information input by the rescue personnel. This feature will allow a rescuer to integrate information stored by CPU 12 such as, for example, date, start time, number of rescue personnel, victim age group, procedures performed, and elapsed time of each procedure, with additional information input from keyboard 32 or through voice recognition 40 system.

For example, when using a computer or terminal during a CPR rescue, a rescuer could hit a key or touch the notes input icon 216 that would open up a file to record input from the computer 10 and rescuer. This input could be keyed in as text, recorded as speech by the computer, or keyed in as graphic symbols. In the same way, any other keystrokes could be recorded and date stamped. The elapsed time could be transferred from the computer memory and recorded together with the date and time of day. Later, other moves, such as changing from "choking unconscious" to "single rescuer CPR" could be recorded and date stamped. As a consequence, the rescuer can automatically furnish a report for medical centers, insurance claims, and the like from this notes file without the stress of reconstructing the information from recall. As an ongoing medical record, a medical center can store this information for future or immediate use. An emergency room can record rescue data automatically during times of chaos and allow this data to become a vital part of the patient medical record, which can be stored or printed out. The rescuer can complete the diary by keying in the victim's name and any unusual circumstance. The rescuers could be named, the paramedics listed, time of death recorded, and the like.

The invention can be implemented in several spoken languages by adding alternate sound and text files in the other languages. The CPR aiding computer program would access a different set sound and text files in a selected alternate spoken language when constructing screens with synchronized voice and image guidance, at no significant loss in speed. Selection of an alternate spoken language may be programmed to be set upon installation of the program or as a user option for each rescue.

Having described specific embodiments of the invention, other embodiments and uses will now become apparent to those skilled in the art without departing from the inventive concepts. Consequently, the invention is to be construed as embracing each and every novel feature and novel combination of features present in or possessed by the apparatus and techniques herein disclosed and limited solely by the spirit and scope of the appended claims.

What is claimed is:

1. A general purpose computer system adapted for cardiopulmonary resuscitation (CPR) aiding to provide guidance to rescue personnel trained in CPR for resuscitating a victim under an emergency condition, comprising:
   a computer terminal, including:
      an output comprising a display and an electroacoustical transducer; and
      an input comprising an interactive display input, wherein the interactive display input is adapted for selecting from image or text viewed on the display that is representative at least of characteristics of said victim relevant to proper performance of CPR techniques, and producing information signals corresponding to the characteristics of said victim represented by said image or text selected with said interactive display input;
   a processing unit responsive to the information signals and for providing output signals representative of proper steps to be taken in resuscitating said victim; and
   wherein the output, in response to said output signals, provides guidance signals, which include audible speech signals produced by the electroacoustical transducer, of the proper steps to be taken by said rescue personnel in resuscitating said victim.

2. The computer system of claim 1, wherein the guidance signals further include visible signals on the display.

3. The computer system of claim 2, wherein said visible signals include a pictorial representation of a rescue personnel practicing said proper steps upon a victim.

4. The computer system of claim 3, wherein the pictorial representation includes an animated sequence of images.

5. The computer system of claim 3, wherein said information signals are further representative of the number of said rescue personnel relevant to proper performance of CPR techniques.

6. The computer system of claim 5, wherein the visible display further provides text signals representative of at least one of said relevant characteristics of said victim and said number of said rescue personnel.

7. The computer system of claim 5, wherein said visible display further provides icon representations of at least one of said relevant characteristics of said victim and said number of rescue personnel.

8. The computer system of claim 3, wherein said output signals are further representative of queries regarding at least one of said relevant characteristics of said victim and the number of said rescue personnel relevant to proper performance of CPR techniques.

9. The computer system of claim 3, wherein said input further includes at least one of an alphanumeric keypad for keying the information signals, and a voice recognizer for converting speech information signals into corresponding electrical signals.

10. The computer system of claim 3, wherein said input, said processor unit and said output comprise components of a personal computer.

11. The computer system of claim 10, and further comprising a network of personal computers linked to each other and to said first mentioned personal computer.

12. The computer system of claim 3, and further comprising a recorder for providing a record of a sequence of the information signals and the output signals.

13. A general purpose computer network system adapted to provide guidance to rescue personnel trained in cardiopulmonary resuscitation for resuscitating victims under emergency conditions, comprising:
   a plurality of peripheral units, each including an input for entering information signals representative at least of characteristics of a victim relevant to proper performance of CPR techniques, and an output including a display and an electroacoustical transducer, wherein the input comprises an interactive display input adapted for selecting displayed image or text representative at least of characteristics of said victim relevant to proper performance of CPR techniques, and producing information signals corresponding to the characteristics of said victim represented by said image or text selected with said interactive display input;
   a network server, including a router, responsive to said information signals for providing output signals representative of proper steps to be taken in resuscitating said victim; and
   a communication link for communicating the information signals from the peripheral units to the network server and the output signals from the network server to the peripheral units, wherein said output provides guidance signals in response to said output signals, said guidance signals including audible speech signals representative of the proper steps to be taken by said rescue personnel in resuscitating said victim.

14. The computer network system of claim 13, wherein said guidance signals further include visible guidance signals on the display representative of the proper steps to be taken by said rescue personnel in resuscitating said victim and synchronized with said audible speech signals.

15. The computer network system of claim 14, wherein the visible guidance signals include a pictorial representation of rescue personnel practicing said proper steps upon a victim.

16. The computer network system of claim 15, wherein the pictorial representation includes an animated sequence of images.

17. The computer network system of claim 14, wherein said communication link includes at least one of a wireless communication system and a hard-wired communication system.

18. The computer network system of claim 17, wherein said hard-wired communication system includes a member of the group consisting of a local area network, a PBX network, an interactive CATV network, a telephone network, and the internet.

19. The computer network system of claim 17, wherein said wireless communication system includes a transmitter and a receiver.

20. The computer network system of claim 14, and further including a recorder for providing a record of a sequence of the information signals and the output signals.

21. An article of manufacture, comprising:
a computer usable medium adapted for use in a general purpose computer having a processor, a display, an interactive display input, and an electroacoustical transducer, the computer usable medium having computer readable program code embodied therein for providing guidance signals to rescue personnel trained in CPR for resuscitation of a victim under an emergency condition, including:
computer readable program code for causing the general purpose computer to display image or text on the display corresponding at least to characteristics of said victim relevant to proper performance of CPR techniques;
computer readable program code for causing the general purpose computer to produce information signals based upon image or text selected by rescue personnel with said interactive display input, wherein said information signals are representative of said characteristics corresponding to said selected image or text;
computer readable program code for causing the general purpose computer to provide output signals representative of proper steps to be taken in resuscitating said victim in response to said information signals; and
computer readable program code for causing the general purpose computer to produce audible speech signals representative of proper steps to be taken by said rescue personnel in resuscitating said victim in response to said output signals.

22. The article of manufacture of claim 21, wherein the computer readable program code in the article of manufacture further includes:
computer readable program code for causing the computer, in response to said output signals, to display visible signals on the display synchronized with the audible speech signals, the visible signals representative of proper steps to be taken by said rescue personnel in resuscitating said victim.

23. The article of manufacture of claim 22, wherein the visible signals include a pictorial representation of rescue personnel practicing said proper steps upon a victim.

24. The article of manufacture of claim 23, wherein the computer readable program code in the article of manufacture further includes:
computer readable program code for causing the computer to display an animated sequence of the pictorial representations.

25. The article of manufacture of claim 24, wherein the computer readable program code in the article of manufacture further includes:
computer readable program code for causing the computer to synchronize the audible speech signals with the animated sequence of pictorial representations.

26. The article of manufacture of claim 24, wherein the visible signals further include icon representations at least of characteristics of said victim relevant to proper performance of CPR techniques.

27. The article of manufacture of claim 24, wherein the visible signals further include text representations at least of characteristics of said victim relevant to proper performance of CPR techniques.

28. The article of manufacture of claim 24, wherein the computer readable program code in the article of manufacture further includes:
computer readable program code for causing the computer to store a record of a sequence of the information signals and the output signals.

29. The article of manufacture of claim 24, wherein said information signal is further representative of the number of said rescue personnel.

30. The article of manufacture of claim 24, wherein said information signal includes a language selection signal and the computer readable program code in the article of manufacture further includes computer readable program code for causing the computer to produce the audible speech signals in a spoken language selected from a group of spoken languages in response to said language selection signal.

31. A computer program for providing guidance signals to rescue personnel trained in CPR for resuscitating a victim under an emergency condition, the computer program being stored on a media readable by a general purpose computer, for configuring the computer upon being read and executed by the computer to perform functions comprising:
displaying image or text on the display corresponding at least to characteristics of said victim relevant to proper performance of CPR techniques;
producing information signals based upon image or text selected by rescue personnel with said interactive display input, wherein said information signals are representative of said characteristics corresponding to said selected image or text;
providing output signals representative of proper steps to be taken in resuscitating said victim in response to said information signals; and
providing guidance signals representative of proper steps to be taken by said rescue personnel in resuscitating said victim in response to said information signal, said guidance signals comprising audible speech signals.

32. The computer program of claim 31, wherein said guidance signals further comprise visible signals on a display representative of said proper steps to be taken by said rescue personnel in resuscitating said victim in response to said information signal.

33. The computer program of claim 32, wherein said functions further comprise synchronizing the audible speech signals with the visible signals.

34. The computer program of claim 32, wherein the visible signals include a pictorial representation of rescue personnel practicing said proper steps upon a victim.

35. The computer program of claim 34, wherein said functions further comprise animating said pictorial representation.

36. The computer program of claim 32, wherein said functions further comprise causing the computer to store a record of a sequence of the information signals and the output signals.

37. The computer program of claim 32, wherein the information signal is further representative of the number of rescue personnel.

38. The computer program of claim 32, wherein said functions further comprise:
- receiving a language selection signal indicative of a spoken language selected from a plurality of spoken languages; and
- causing the computer to produce the audible speech signals in the selected spoken language in response to the language selection signal.

39. A method for use in cardiopulmonary resuscitation with a general purpose computer system configured for providing guidance to rescue personnel trained in cardiopulmonary resuscitation (CPR) for resuscitating a victim under an emergency condition, the computer system comprising a computer terminal having an input and an output, a processing unit responsive to the input, the output being responsive to the processor and including a display and an electroacoustical transducer, the input including an interactive display input, the method including:
- displaying image or text on the display corresponding at least to characteristics of said victim relevant to proper performance of CPR techniques;
- producing information signals based upon image or text selected by rescue personnel with said interactive display input, wherein said information signals are representative of said characteristics corresponding to said selected image or text;
- processing said information signals, including providing output signals representative of proper steps to be taken in resuscitating said victim;
- converting said output signals into signals corresponding to speech signals representative of the proper steps to be taken by said rescue personnel in resuscitating said victim; and
- applying said signals corresponding to speech signals to the electroacoustical transducer to provide audible speech guidance signals representative of the proper steps to be taken by said rescue personnel in resuscitating said victim.

40. The method of claim 39, wherein said computer terminal further comprises an electroacoustical transducer responsive to said output signals, and wherein said method further comprises converting said output signals to signals corresponding to visible signals representative of the proper steps to be taken by said rescue personnel in resuscitating said victim, and applying said signals corresponding to visible signals to said display to provide visible guidance signals representative of the proper steps to be taken by said rescue personnel in resuscitating said victim synchronized with said audible speech guidance signals.

41. The method of claim 40, wherein said visible guidance signals include an animated sequence of images of a rescue personnel practicing said proper steps upon a victim.

42. The method of claim 40, wherein said input, processor and output of said computer system comprise a personal computer in a network of computers, including a router, linked to each other.

43. The method of claim 40, wherein said method further includes storing a record of said information signals on a storage medium.

* * * * *